(12) United States Patent
Calandruccio

(10) Patent No.: US 7,201,431 B1
(45) Date of Patent: Apr. 10, 2007

(54) CAMPER

(76) Inventor: Peter Calandruccio, P.O. Box 393, Creede, CO (US) 81130

( * ) Notice: Subject to any disclaimer, the term of this patent is extended or adjusted under 35 U.S.C. 154(b) by 0 days.

(21) Appl. No.: 11/269,172

(22) Filed: Nov. 8, 2005

(51) Int. Cl.
  *B60P 3/355* (2006.01)
(52) U.S. Cl. .................................. 296/173; 296/165
(58) Field of Classification Search ............... 296/173, 296/68, 135, 156; 454/900, 130, 132
  See application file for complete search history.

(56) References Cited

U.S. PATENT DOCUMENTS

| | | | | |
|---|---|---|---|---|
| 3,617,086 A | * | 11/1971 | King et al. | 296/172 |
| 3,623,762 A | * | 11/1971 | Fagan | 135/88.15 |
| 3,703,311 A | * | 11/1972 | Davis et al. | 296/161 |
| 3,807,104 A | * | 4/1974 | Webster | 52/70 |
| 3,862,526 A | * | 1/1975 | Loughlin | 296/173 |
| 4,057,284 A | * | 11/1977 | Blank | 296/173 |
| 4,088,363 A | * | 5/1978 | Palmer | 296/161 |
| 4,201,413 A | | 5/1980 | Rowe | |
| 4,807,924 A | * | 2/1989 | Kottke | 296/174 |
| 5,375,902 A | * | 12/1994 | Church | 296/173 |
| 5,419,607 A | * | 5/1995 | Oliveira | 296/165 |
| 5,954,076 A | * | 9/1999 | McGinnis | 296/165 |
| 6,170,502 B1 | * | 1/2001 | Pullen | 296/174 |
| 6,394,531 B2 | * | 5/2002 | Thompson et al. | 296/165 |
| 6,739,617 B1 | * | 5/2004 | Martin | 296/169 |
| RE38,766 E | * | 8/2005 | Karlsson | 296/161 |
| 7,021,694 B1 | * | 4/2006 | Roberts et al. | 296/164 |

* cited by examiner

*Primary Examiner*—Kiran B. Patel
(74) *Attorney, Agent, or Firm*—Pitts & Brittian, P.C.

(57) ABSTRACT

A camper having passive solar climate controls. The camper has a solar structure carried by a base. The solar structure includes a cover, a window panel, a ridge vent, a plurality of awnings, and a plurality of side panels. The ridge vent and the awnings are carried by the cover and the window panel. The window panel and the cover are each pivotally attached to the base such that they are rotated toward the base into a collapsed position and/or away from the base into an extended position. A gable connector secures the cover and the window panel in the extended position. The side panels cooperate with the cover and the window panel to define an interior within the camper. The window panel includes a window and a solar curtain adapted to releasably cover the window. The ridge vent is received by a ventilation opening proximate the gable connector.

15 Claims, 8 Drawing Sheets

CAMPER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to camper structures. More particularly, this invention pertains to a camper structure including a device that uses solar energy to provide passive climate controls within the camper structure.

2. Description of the Related Art

Recreational camper structures in a variety of designs and forms are used widely by persons who desire convenient yet mobile camping facilities. A variety of recreational camper vehicles and accessories have been developed which are intended to travel over rough terrain or off-the-road conditions so that at the arrival at a campsite, the camper vehicle may be used for sleeping, living or storage purposes. Of these camper vehicles, many provide off-road camping facilities which include motor vehicle drawn trailers that have a camper structure adapted to be collapsed for storage and expanded for use.

Many current collapsible camper structures are constructed without heating and air-conditioning systems. Therefore, in many camper structures, the temperature of the camper vehicle interior is not susceptible to control. Instead, the user must understand and accept the potential temperature extremes that can occur within the camper structure and plan his or her use of the camper structure accordingly.

Occasionally, collapsible camper structures are equipped with devices utilizing combustible fuel sources, such as propane, for heat. However, fuel for these heating devices is often expensive and environmentally unfriendly. Moreover, the fuel must be transported for use with the camper structure, and often, fuel storage consumes a considerable amount of space within the camper structure.

Several prior art devices in the field of camper structures currently exist. Typical of the art are those devices disclosed in the following U.S. patents:

| Patent No. | Inventor(s) | Issue Date |
| --- | --- | --- |
| 3,807,104 | Webster | Apr. 30, 1974 |
| 4,201,413 | Rowe | May 6, 1980 |
| 4,807,924 | Kottke | Feb. 28, 1989 |
| 5,375,902 | Church | Dec. 27, 1994 |

Of these patents, U.S. Pat. No. 3,807,104, issued to Webster, discloses a collapsible structure comprising a pair of rectangular panels hinged together and to a pair of triangular panels. The rectangular panels are adapted to be hingedly folded and arranged in parallel to one another. The triangular panels are adapted to be folded for storage and received between the rectangular panels. The rectangles can be rotated proximate one another to define an inverted V-shaped structure, and the triangles can be folded outwardly and fastened into position once the rectangular panels are folded outward.

U.S. Pat. No. 4,201,413 ('413), issued to Rowe, discloses an improvement in folding apparatus for expandable top camper bodies. The '413 patent includes a bi-fold panel comprised of two foldable panel sections hinged to each other and to the lateral wall of the camper and the top of the camper. The hinges are spring-loaded to self actuate and push the top upwardly to its expanded position and retain it in that position.

U.S. Pat. No. 4,807,924 ('924), issued to Kottke, discloses a folding camper for mounting in a pick-up truck. The camper includes a base frame, a pair of roof panels hinged to the sides of the base frame and adapted to fold inwardly, and a pair of triangular-shaped front and rear panels hinged to the front and rear ends of the base frame. The front and rear panels are adapted to fold inwardly beneath the roof panels such that the folding camper can be oriented into traveling mode.

Church, in U.S. Pat. No. 5,375,902, discloses a trailer intended to be drawn by a motor vehicle. The trailer has a wheeled body with a bottom and a continuous sidewall defining an internal storage cavity closeable by a hinged lid. The external side of the lid carries a storage rack while the internal side attaches with one-half of a folding tent-like structure. The other half of the tent-like structure is secured to the peripheral edge of the body sidewall and rigid support rods are pivotally carried on the hinge line of the lid so that when the lid is raised, the tent-like structure is deployed into a fully extended operative position.

Other devices have been developed to utilize solar energy in the heating and cooling field. Typical of the art are those devices disclosed in the following U.S. patents:

| Patent No. | Inventor(s) | Issue Date |
| --- | --- | --- |
| 3,595,216 | Lanciault | Jul. 21, 1971 |
| 5,379,753 | Noennich | Jan. 10, 1995 |
| 5,582,197 | Dobberstein | Dec. 10, 1996 |
| 6,812,397 | Lambey | Nov. 2, 2004 |

U.S. Pat. No. 3,595,216, issued to Lanciault, discloses a mobile solar water heater. The water heater includes a water tank and water heating coils positioned in a heater box. The heater box is exposed to solar energy, and the water heater is mounted on the top of a camper.

Noennich, in U.S. Pat. No. 5,379,753 ('753), discloses a solar panel control apparatus for varying the position of a solar panel mounted upon a roof. The '753 device includes a solar panel support frame, together with several pivoting support members interconnected in such a way as to allow the angular positioning of a solar panel proximate the surface of a roof. The control apparatus is adapted to allow a solar panel to be mounted on a motorized vehicle.

A fabric tent incorporating solar reflective and absorbent surfaces is disclosed in U.S. Pat. No. 5,582,197, issued to Dobberstein. The fabric tent walls are constructed to include insulated liners and solar reflective and absorptive surfaces. The walls assemble to an irregular triangular shape and can be reversed to optimally collect and reflect solar and thermal radiation in relation to one or more occupants and the prevailing conditions. Rotating vents with overlapping apertures control interior temperature.

A photocurrent-generating fabric and support is disclosed in U.S. Pat. No. 6,812,397 ('397), issued on Nov. 2, 2004.

The '397 device is intended to be used as a shade, awning, blind and swimming pool cover. The device includes a photocurrent-generating fabric and a support for winding and storing the fabric. The support is formed by an axisymetric tube of regular polygonal cross-section around the periphery of which the fabric is wound. The photocurrent-generating fabric includes a layer of interconnected photovoltaic cells.

BRIEF SUMMARY OF THE INVENTION

A camper with passive solar climate controls is disclosed. The camper includes generally a solar structure carried by a base. The solar structure includes a cover, a window panel, a ridge vent, a plurality of awnings, and a plurality of side panels. The ridge vent and the awnings are carried by the cover and the window panel. The window panel and the cover are carried by the base. The side panels cooperate with the cover and the window panel to form an interior within the camper.

The cover includes a substantially rigid opaque surface with protruding sidewalls. The sidewalls protrude substantially orthogonally from the opaque surface, proximate the edges of the opaque surface. The cover includes a first end and a second end. The cover first end is pivotally connected to the base by a first hinge, such that the cover is rotated away from the base into an extended position, and toward the base into a collapsed position.

The window panel includes a window fixedly connected to a frame, and a solar curtain adapted to releasably cover the window. The window defines a substantially transparent surface. The window panel includes a first end and a second end. A second hinge pivotally connects the first end of the window panel to the base opposite the cover, such that the window panel is rotated away from the base into an extended position, and toward the base into a collapsed position. Additionally, the second hinge cooperates with the frame to substantially define the perimeter of the transparent surface.

The solar curtain comprises a panel that is both heat-reflective and heat-insolative. The solar curtain is adapted to releasably cover the window. This configuration allows the solar curtain to be positioned to reflect solar radiation while insulating the cooler air within the interior, or to allow solar radiation to enter and warm the interior.

The opaque surface of the cover defines a substantially arcuate profile with a concave surface and a convex surface. The concave surface faces inwardly, and the convex surface faces outwardly. Likewise, the window defines a substantially arcuate profile with a concave surface and a convex surface. The concave surface faces inwardly, and the convex surface faces outwardly. This configuration provides structural strength to the window panel and the cover. Furthermore, the arcuate profile reduces the need for additional structural support for the window, while also increasing the aerodynamic properties of the cover.

When in the collapsed position, the window panel is folded toward the base such that the window panel is substantially flush with the top of the base. The cover is folded toward the base and positioned above the window panel. This configuration allows the cover to define a protective shield for the window panel and the base during transportation of the camper.

When in the extended position, the cover second end and the window panel second end are held in a gabled configuration by a gable connector comprising a pin or other suitable connector. A ventilation opening is positioned between the window panel second end and the cover second end. Once configured to the extended position, the ridge vent is adapted to be received by the ventilation opening.

The ridge vent is selectively movable between an open position and a closed position. In the illustrated embodiment, the ridge vent includes a screen and a damper. The screen is adapted to be received by the ventilation opening such as to substantially fill the ventilation opening and to allow air ventilation through the screen. The damper is movably attached to the cover proximate the ventilation opening such as to allow the damper to be adjusted from a position completely blocking the ventilation opening to a range of positions varying the degree to which the damper blocks the ventilation opening. This configuration allows the damper to regulate air ventilation through the ridge vent.

The gable connector is offset from the cover second end such that the second end of the cover extends above the second end of the window panel. This configuration defines an overhang proximate the ventilation opening, which extends above the ventilation opening and shelters the ventilation opening from exposure to precipitation.

The solar structure includes at least one awning. The awning acts to block solar radiation, providing shade to the air surrounding the exterior of the side panels. Each awning includes a shade panel defining an opaque surface, and each shade panel is supported by a plurality of support members.

At least one side panel cooperates with the cover and the window panel to enclose an interior within the camper. At least one side panel defines a vent opening. Each vent opening is openable and closable to allow for regulation of air ventilation to the interior. At least one side panel further defines an opening to provide user access to the interior of the camper. The side panels, awnings, and ridge vent and their corresponding operability work together to allow the user to regulate ventilation and internal thermal comfort.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A camper with passive solar climate controls is disclosed. The camper, illustrated at 10 in the figures, provides a unique mobile living-support system adapted to utilize solar energy for heating and cooling the interior of the collapsible camper vehicle, and for regulation of ventilation and internal thermal comfort.

Figure 1:
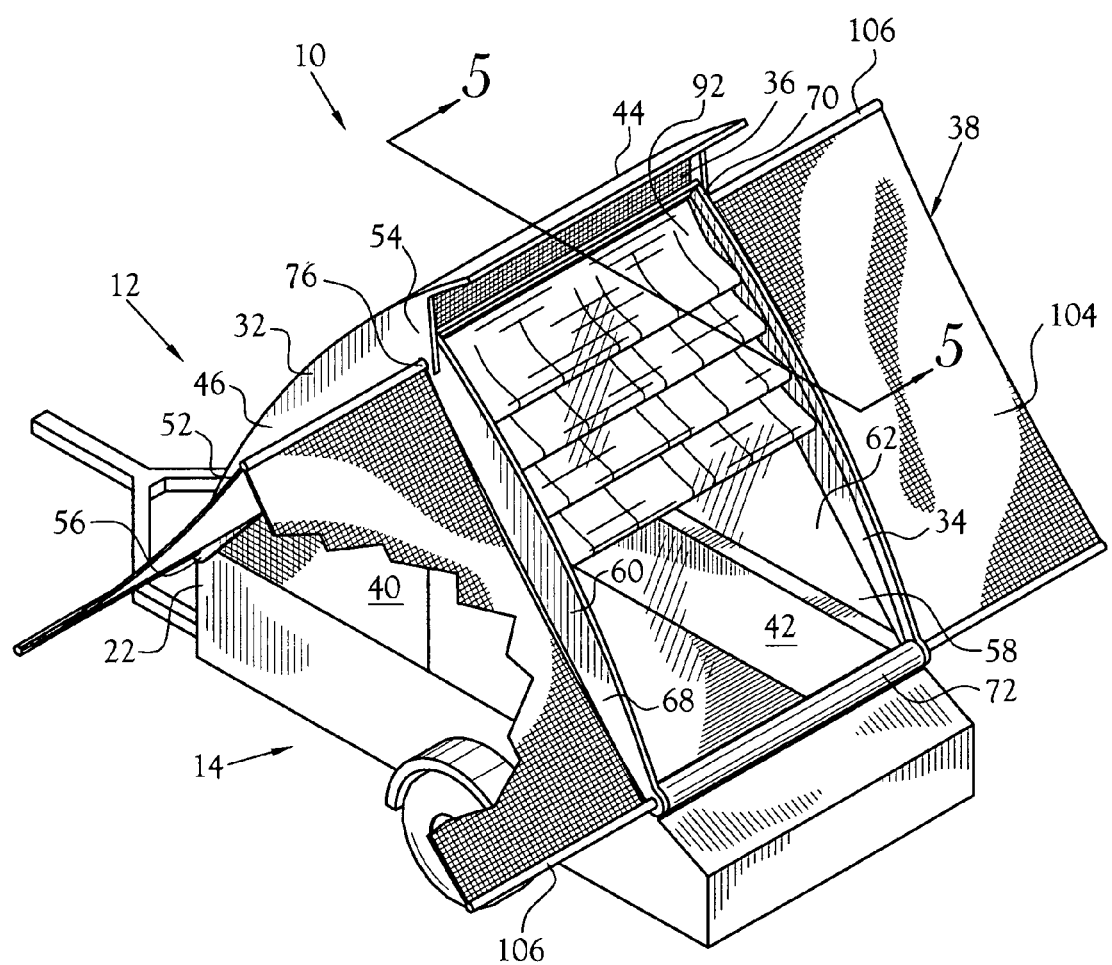
FIG. 1 is a perspective view of one embodiment of a camper constructed in accordance with several features of the present invention, showing the solar structure in the extended position with the awning in place.

FIG. 1 is a perspective view of one embodiment of a camper 10 constructed in accordance with several features of the present invention. The camper 10 includes generally a solar structure 12 carried by a base 14. The solar structure 12 includes a cover 32, a window panel 34, a ridge vent 36, a plurality of awnings 38, and a plurality of side panels 40. The ridge vent 36 and the awnings 38 are carried by the cover 32 and the window panel 34. The window panel 34 and the cover 32 are carried by the base 14. As discussed in greater detail below, the side panels 40 cooperate with the cover 32 and the window panel 34 to form an interior 42 within the camper, and to regulate ventilation and internal thermal comfort.

Figure 2:
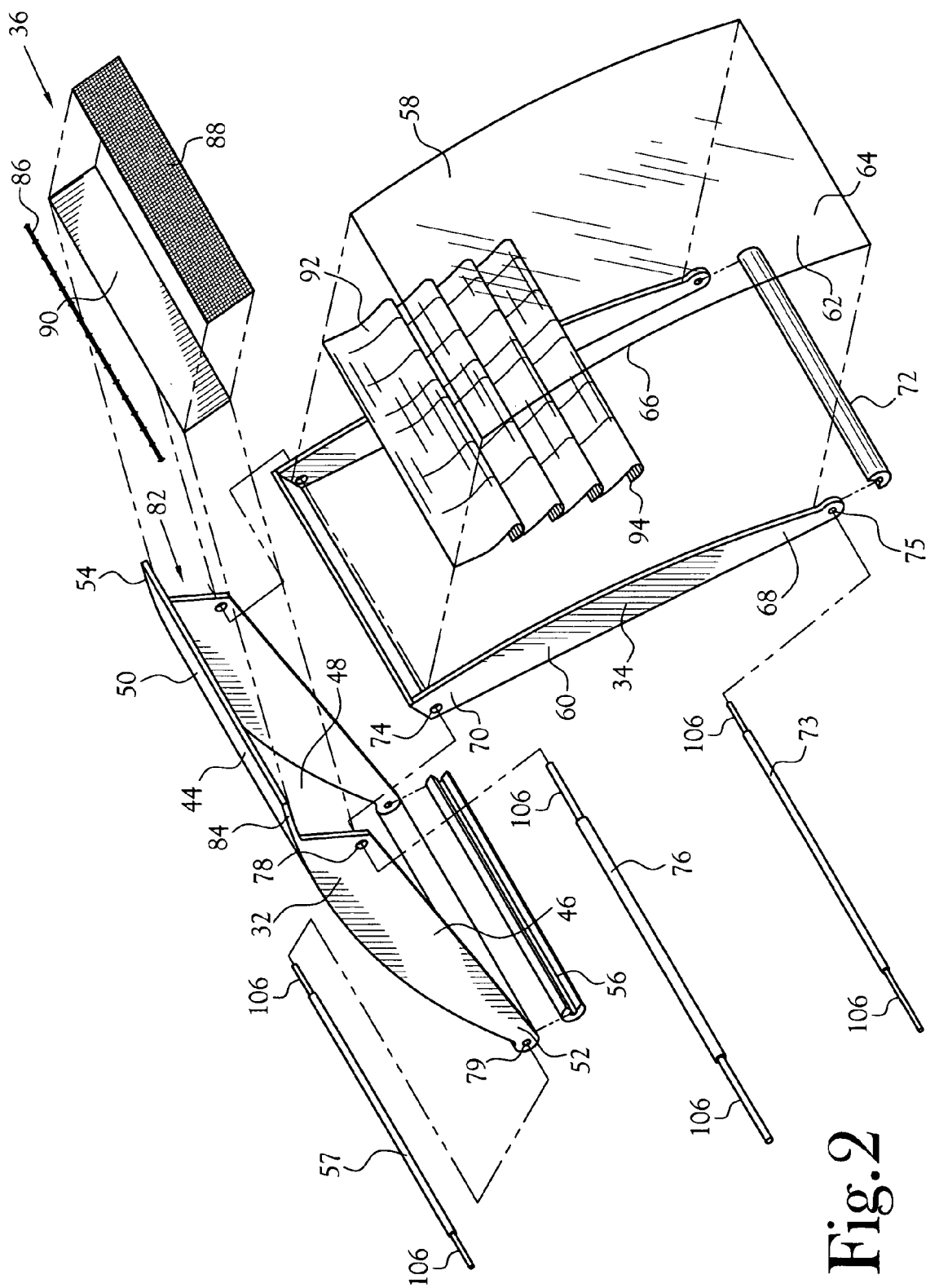
FIG. 2 is an exploded view, in perspective, showing the cover and the window panel of the camper of FIG. 1, exploded from their relative extended positions.

FIG. 2 illustrates an exploded view, in perspective, of the cover 32 and the window panel 34 of the camper 10. Referring to FIGS. 1 and 2, the cover 32 includes a substantially rigid opaque surface 44 with protruding sidewalls 46. The sidewalls 46 protrude substantially orthogonally from the opaque surface 44, proximate the edges of the opaque surface 44. The cover 32 includes a first end 52 and a second end 54. The cover first end 52 is pivotally connected to the base 14 by a first hinge 56 and cooperating first hinge pin 57, such that the cover 32 is rotated away from the base 14 into an extended position, and toward the base 14 into a collapsed position.

The window panel 34 includes a window 58 fixedly connected to a frame 60, and a solar curtain 92 adapted to releasably cover the window 58. The window 58 defines a substantially transparent surface 62. The window panel 34 includes a first end 68 and a second end 70. A second hinge 72 cooperates with a second hinge pin 73 to pivotally connect the first end 68 of the window panel to the base 14 opposite the cover 32, such that the window panel 34 is rotated away from the base 14 into an extended position, and toward the base 14 into a collapsed position. Additionally, the second hinge 72 cooperates with the frame 60 to substantially define the perimeter of the transparent surface 62.

As illustrated in FIG. 2, the opaque surface 44 of the cover 32 defines a substantially arcuate profile with a concave surface 48 and a convex surface 50. The concave surface 48 faces inwardly, and the convex surface 50 faces outwardly. Likewise, the window 58 defines a substantially arcuate profile with a concave surface 66 and a convex surface 64. The concave surface 66 faces inwardly, and the convex surface 64 faces outwardly. This configuration provides structural strength to the window panel 34 and the cover 32. Furthermore, the arcuate profile reduces the need for additional structural support for the window 58, while also increasing the aerodynamic properties of the cover 32.

In the illustrated embodiment, the cover 32 and the window panel 34 are shown in their extended position. As discussed in greater detail below, the cover second end 54 and the window panel second end 70 are held in a gabled configuration by a gable connector 76 comprising a pin or other suitable connector. While positioned in this gabled configuration, the ridge vent 36 is positioned between the cover second end 54, and the window panel second end 70.

The solar structure 12 includes at least one awning 38. The awning 38 acts to block solar radiation, providing shade to the air surrounding the exterior of the side panels 40. The awning 38 includes a shade panel 104 held in place by a plurality of support members 106.

The embodiment of FIG. 1 includes an awning 38 constructed in accordance with the present invention. In the illustrated embodiment, one awning 38 is provided for each of the two side panels 40. Each awning 38 includes a shade panel 104 defining an opaque surface, and each shade panel 104 is supported by three support members 106. Of course, those skilled in the art will recognize that more or fewer support members may be utilized to accomplish the awning feature of the present invention. The support members 106 extend orthogonally outwardly from the solar structure 12, proximate the perimeter of each of the side panels 40.

As shown in FIG. 2, one support member 106 telescopically extends from each of opposite ends of the first hinge pin 57. Similarly, one support member 106 telescopically extends from each of opposite ends of the second hinge pin 73, and one support member 106 telescopically extends from each of opposite ends of the gable connector 76. This configuration allows the user to extend the support members 106 axially outwardly from the first and second hinges 56, 72 and the gable connector 76, and then to affix a plurality of shade panels 104 to the extended support members 106. It is recognized that those skilled in the art will appreciate other configurations to accomplish the awning of the present invention without departing from the spirit and scope of the present invention.

Figure 3:
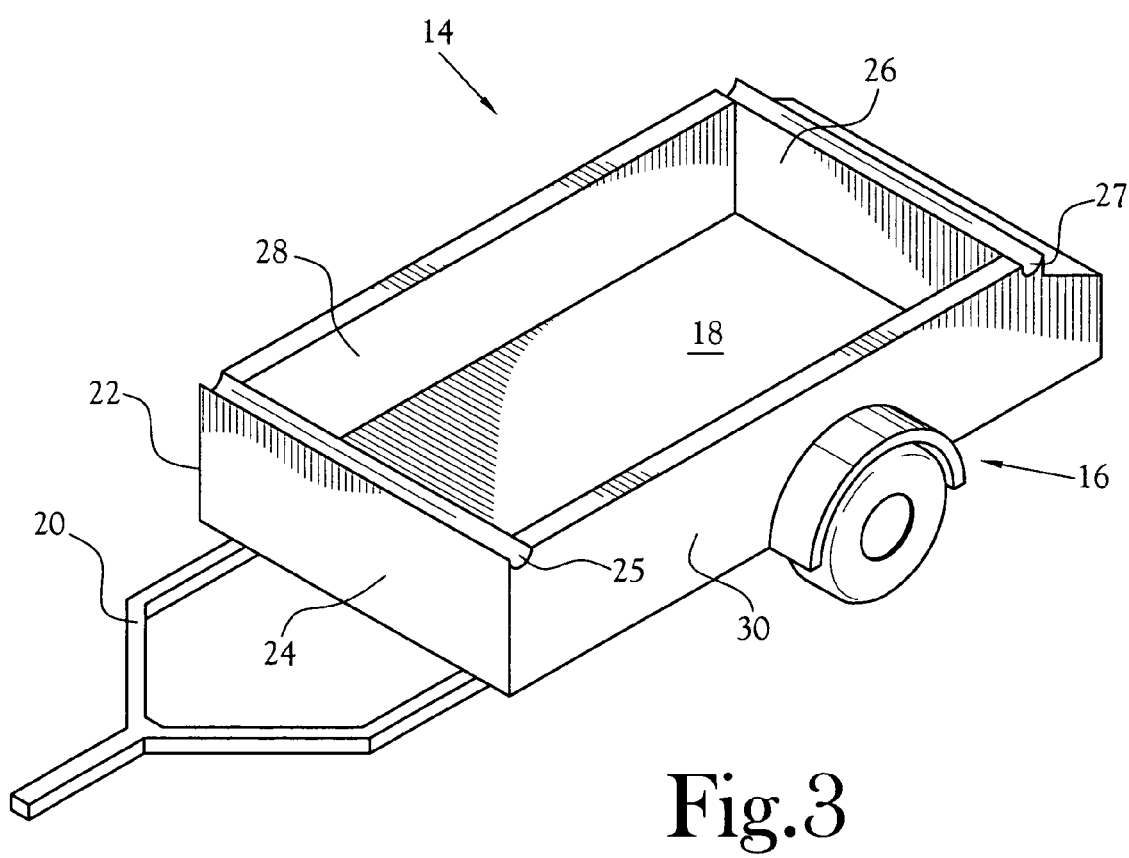
FIG. 3 is a perspective view of the vehicle frame portion of the camper of FIG. 1.

FIG. 3 is a perspective view of one embodiment of the base portion of the camper, better illustrating the configuration of the base 14. In the illustrated embodiment, the base 14 defines a trailer vehicle 16 adapted to be towed by an automobile or other motor vehicle. The trailer vehicle 16 includes a platform 18 mounted on a vehicle chassis 20. A wall structure 22 is carried by the platform 18 and defines the perimeter of the platform 18. The wall structure 22 carries the solar structure 12 and provides support for the various elements of the solar structure 12. In the illustrated embodiment, the wall structure 22 comprises a first wall 24, a second wall 26, a third wall 28, and a fourth wall 30. Of course, it will be recognized that the configuration depicted in this and the other figures with regard to the base is so depicted for simplicity, and is not intended to limit the base to such configuration. To this extent, the solar structure 12 of the present invention is further adapted to be installed on an existing vehicle to accomplish the present invention.

As shown in FIG. 3, the first carriage wall 24 defines a first trough 25 positioned along its upper edge. Similarly, the second carriage wall 26 defines a second trough 27 positioned along its upper edge. It will be understood that the fabrication of the troughs 25, 27 can be accomplished by numerous conventional means, such as by routing out the upper edge of a traditional, rectangular wall.

Referring to FIGS. 2 and 3, the first and second hinges 56, 72 are each defined by a substantially cylindrical housing. The first trough 25 receives the first hinge 56 and the second trough 27 receives the second hinge 72. The first and second hinge pins 57, 73 are each defined by a substantially cylindrical member of sufficient cross-sectional diameter to be received by cooperating hinges 56, 72. Each hinge 56, 72 defines an opening adapted to allow the cooperating hinge pin 57, 73 to rotate axially within the hinge 56, 72. Of course, one skilled in the art will recognize other configurations suitable to accomplish the first and second hinges 56, 72 without departing from the spirit and scope of the present invention.

In the present embodiment, the first and second hinges 56, 72 are fixed to the first and second troughs 25, 27, respectively. The first hinge pin 57 is fixed to the cover first end 52 and received by the first hinge 56. The second hinge pin 73 is fixed to the window panel first end 68 and received by the second hinge 72. In this configuration, the cover 32 rotates about the first hinge 56 and the window panel 34 rotates about the second hinge 72.

In another embodiment, each hinge 56, 72 and corresponding hinge pin 57, 73 is defined by a single, integrated member (not shown). In this embodiment, the first and second hinges 56, 72 are fixed to the cover first end 52 and the window panel first end 68, respectively. The first and second hinges 56, 72 are rotatably fixed within cooperating troughs 25, 27 by conventional means, such as by a connection member received by cooperating receiving members in the respective troughs 25, 27. In this configuration, each hinge 56, 72 rotates freely within each cooperating trough 25, 27. Of course, those skilled in the art will appreciate many additional configurations to rotatably attach the cover first end 52 to the first wall 24 and the window panel first end 68 to the second wall 26. To this extent, it is appreciated that each hinge 56, 72 may be rotatably attached to its cooperating wall 24, 26 using a suitable connection member received by cooperating receiving members in the base 14.

Figure 4:
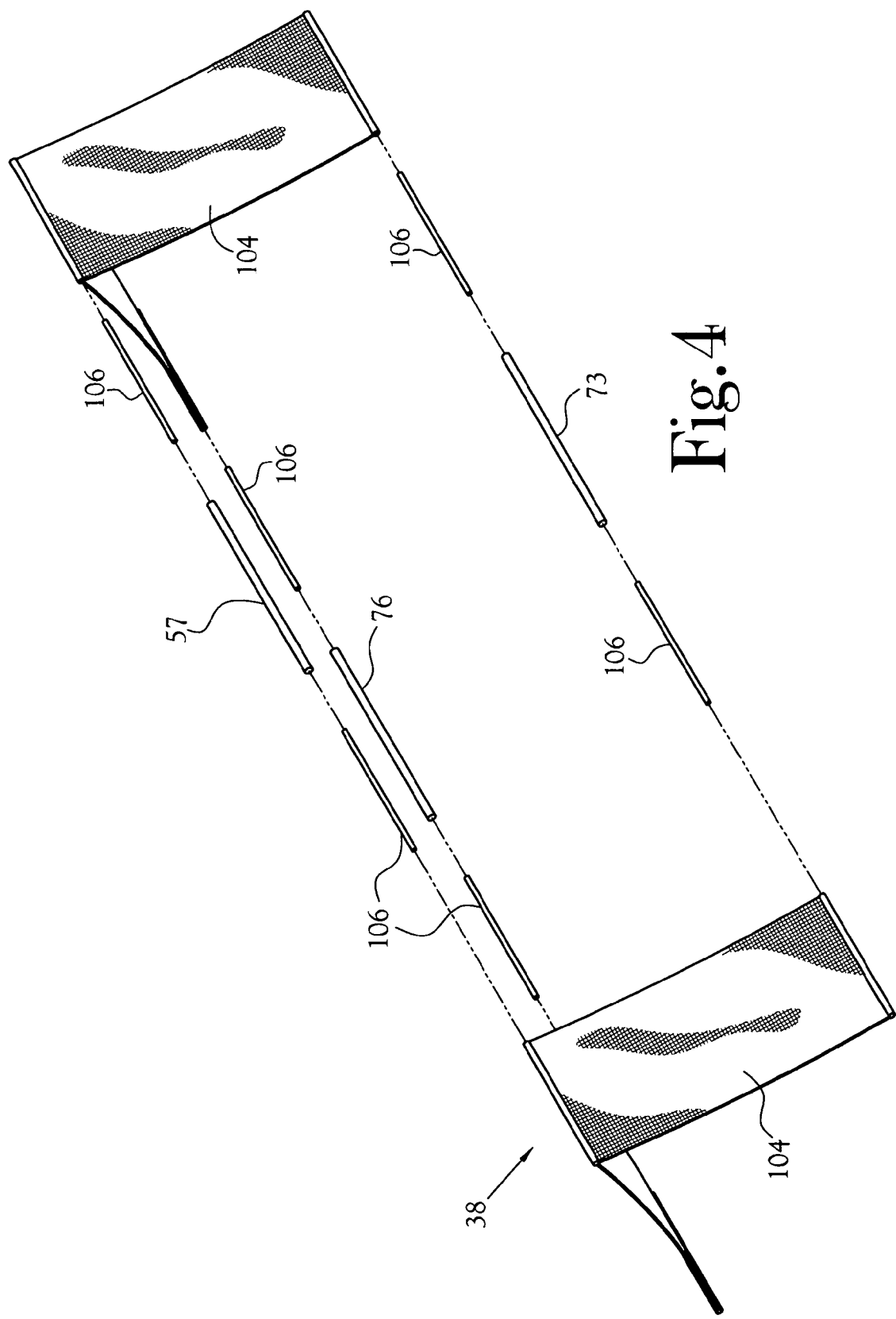
FIG. 4 is an exploded view, in perspective, showing the awnings of the camper of FIG. 1 exploded from the first and second hinge and the gable connector.

FIG. 4 better illustrates the configuration of the support members 106 to the solar structure 12 of the camper 10. FIG. 4 is an exploded view, in perspective, showing the awnings 38 exploded from the first hinge pin 57, the second hinge pin 73, and the gable connector 76. As better illustrated in FIG. 4, one support member 106 is adapted to be received by each of opposite ends of the first hinge pin 57. Similarly, one support member 106 is adapted to be received by each of opposite ends of the second hinge pin 73, and one support member 106 is adapted to be received by each of opposite ends of the gable connector 76.

As shown in FIG. 2, the cover second end 54 includes a first through bore 78 and a second through bore 79, each configured substantially orthogonally to the protruding sidewalls 46. The first through bore 78 is disposed proximate the cover second end 54, and the second through bore 79 is disposed proximate the cover first end 52. Similarly, the window panel second end 70 includes a third through bore 74 and a fourth through bore 75, each configured substantially orthogonally to the frame 60. The third through bore 74 is disposed proximate the window panel second end 70, and the fourth through bore 75 is disposed proximate the window panel first end 70. The gable connector 76 is adapted to be received by the first and third through bores 74, 78 and to hold the first and third through bores 74, 78 in substantial registration. Referring to FIGS. 2 and 4, the first hinge pin 57 is received by the second through bore 79 and the first hinge 56 to pivotally connect the cover 32 to the first wall 24. The second hinge pin 73 is received by the fourth through bore 75 and the second hinge 72 to pivotally connect the window panel 34 to the second wall 26. Each support member 106 is adapted to extend axially outwardly from the first and second hinge pins 57, 73 and the gable connector 76. Each shade panel 104 is adapted to receive a plurality of extended support members 106 to define an awning 38.

Figure 5:
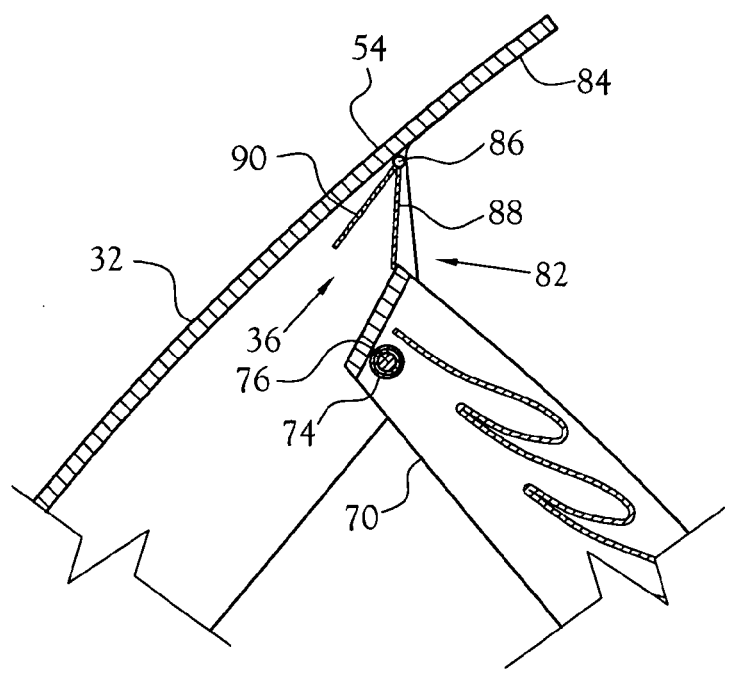
FIG. 5 is a partial side elevation view, in section taken along 5—5 of FIG. 1, of the ridge vent of the camper of the present invention.

FIG. 5 shows a partial cross-sectional view of one embodiment of the solar structure 12, showing the ridge vent 36 connected to the cover 32. A ventilation opening 82 is positioned between the window panel second end 70 and the cover second end 54. In the illustrated embodiment, the cover second end 54 and the window panel second end 70 cooperatively define the ventilation opening 82. However, those skilled in the art will recognize other configurations for the ventilation opening 82 that can be used without departing from the spirit and scope of the present invention.

The gable connector 76 and the corresponding through bores 74, 78 are offset from the cover second end 54 such that the second end of the cover extends above the second end 70 of the window panel. This configuration defines an overhang 84 proximate the ventilation opening 82, which extends above the ventilation opening 82 and shelters the ventilation opening 82 from exposure to precipitation.

Referring to FIGS. 2 and 5, a ridge vent 36 is adapted to be received by the ventilation opening 82. The ridge vent 36 is selectively movable between an open position and a closed position. In the illustrated embodiment, the ridge vent 36 includes a screen 88 and a damper 90. The screen 88 defines a substantially permeable medium such as fabric or other suitable material. The screen 88 is adapted to be received by the ventilation opening 82 such as to substantially fill the ventilation opening 82 while allowing air ventilation through the screen 88. The damper 90 is a panel capable of limiting air flow through the ventilation opening 82. The damper 90 is movably attached to the cover 32 proximate the ventilation opening 82 such as to allow the damper 90 to be adjusted from a position completely blocking the ventilation opening 82 to a range of positions varying the degree to which the damper 90 blocks the ventilation opening 82. This configuration allows the damper 90 to regulate air ventilation through the ridge vent 36.

As illustrated in FIG. 5, the screen 88 and the damper 90 are hinged to each other along associated edges and are hinged to the cover 32 proximate the ventilation opening 82. This configuration allows the screen 88 and the damper 90 to be hingedly folded toward each other and arranged in parallel relation to substantially block the ventilation opening 82. The damper 90 is pivoted away from the screen 88 to allow air ventilation through the ridge vent 36.

In the illustrated embodiment, the damper 90 and the screen 88 are secured to each other and to the cover 32 by a frictional hinge 86 such that the frictional hinge 86 holds the damper 90 and the screen 88 in place proximate the ventilation opening 82. In another embodiment, the screen 88 and the damper 90 are hinged to each other along associated edges and are hinged to the window panel 34 proximate the ventilation opening 82. In still another embodiment, the screen 88 is frictionally secured to substantially fill the ventilation opening 82. The damper 90 is policably fastened to the ventilation opening 82 such that the damper 90 is removed from the ventilation opening 82 to allow air ventilation through the ridge vent 36 and fastened to the ventilation opening 82 to limit air ventilation through the ridge vent 36. Of course, those skilled in the art will recognize that many other devices and configurations may be used to secure the screen 88 and the damper 90 proximate the ventilation opening 82 without departing from the spirit and scope of the present invention.

Figure 6A:
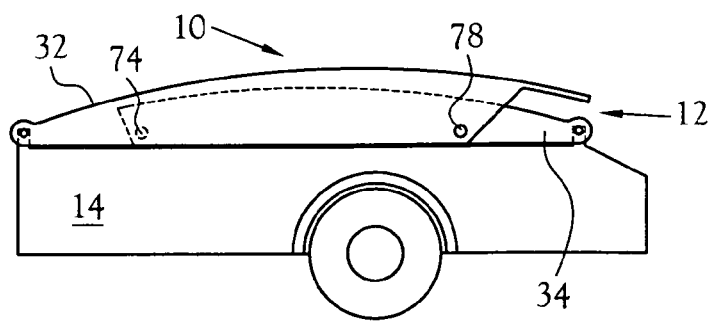
FIG. 6A is a side elevation view of the camper of FIG. 1, showing the cover and the window panel in the collapsed position.

FIG. 6A is a side elevation of the camper, showing the cover 32 and the window panel 34 in the collapsed position. When in the collapsed position, the window panel 34 is folded toward the base 14 such that the window panel 34 is substantially flush with the top of the wall structure 22. The cover 32 is folded toward the base 14 and positioned above the window panel 34. This configuration allows the cover 32 to define a protective shield for the window panel 34 and the base 14 during transportation of the camper 10.

Referring to FIGS. 5 and 6A, the second end 54 of the cover is adapted to movably connect to the second end 70 of the window panel by the gable connector 76. In the illustrated embodiment, the gable connector 76 comprises a pin. The gable connector 76 is keyed to the first through bore 78 proximate the second end 54 of the cover and the second through bore 74 proximate the second end 70 of the window panel. The gable connector 76 secures the second end 70 of the window panel 34 to the second end 54 of the cover 32. Thus, the gable connector 76 supports the cover 32 and the window panel 34 in a gabled configuration.

Figure 6B:
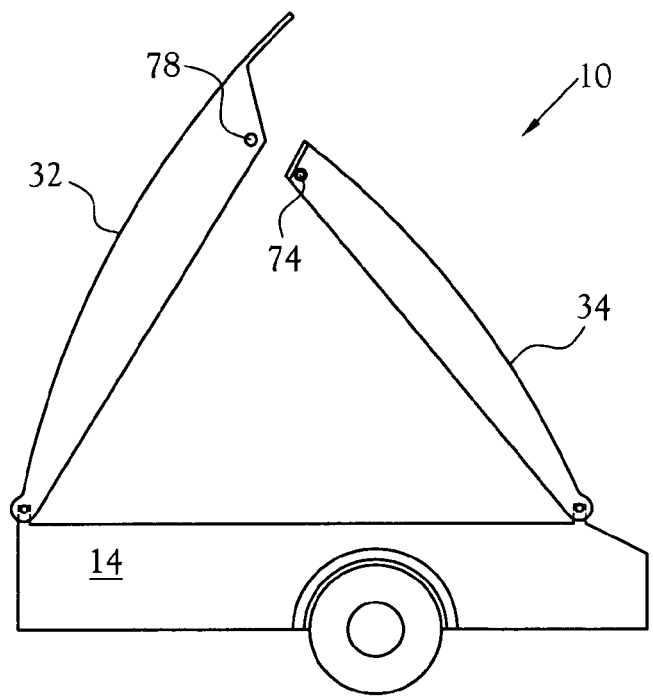
FIG. 6B is a side elevation view of the camper of FIG. 1, showing the cover and the window panel in the extended position prior to installation of the gable connector; wherein the cover and the window panel are pivotally unsupported.
Figure 6C:
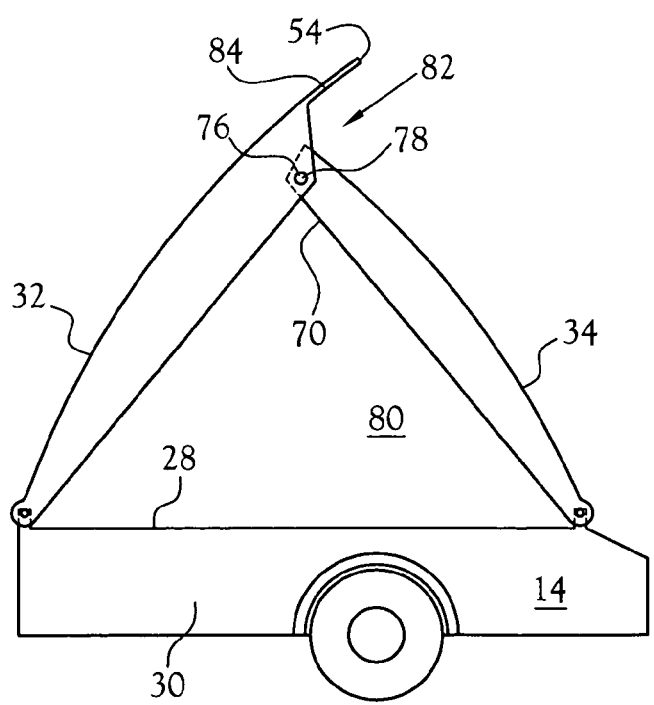
FIG. 6C is a side elevation view of the camper of FIG. 1, showing the cover and the window panel in the extended position after installation of the gable connector; wherein the cover and the window panel are connected to define a roof structure.

FIG. 6B is a side elevation view of a camper 10 of the present invention, showing the cover 32 and the window panel 34 in the extended position prior to installation of the gable connector 76 (See FIG. 5). As shown in FIG. 6B, the cover 32 and the window panel 34 are pivotally unsupported. FIG. 6C shows the cover 32 and the window panel 34 pivoted such as to bring the through bores 74, 78 into substantial registration. The gable connector 76 is received by the through bores 74, 78, such that the cover 32 and the window panel 34 are supported in the extended position. In the extended position, cooperating edges of the cover 32, the window panel 34, and the wall structure 22 define a plurality of side perimeters 80.

Figure 7:
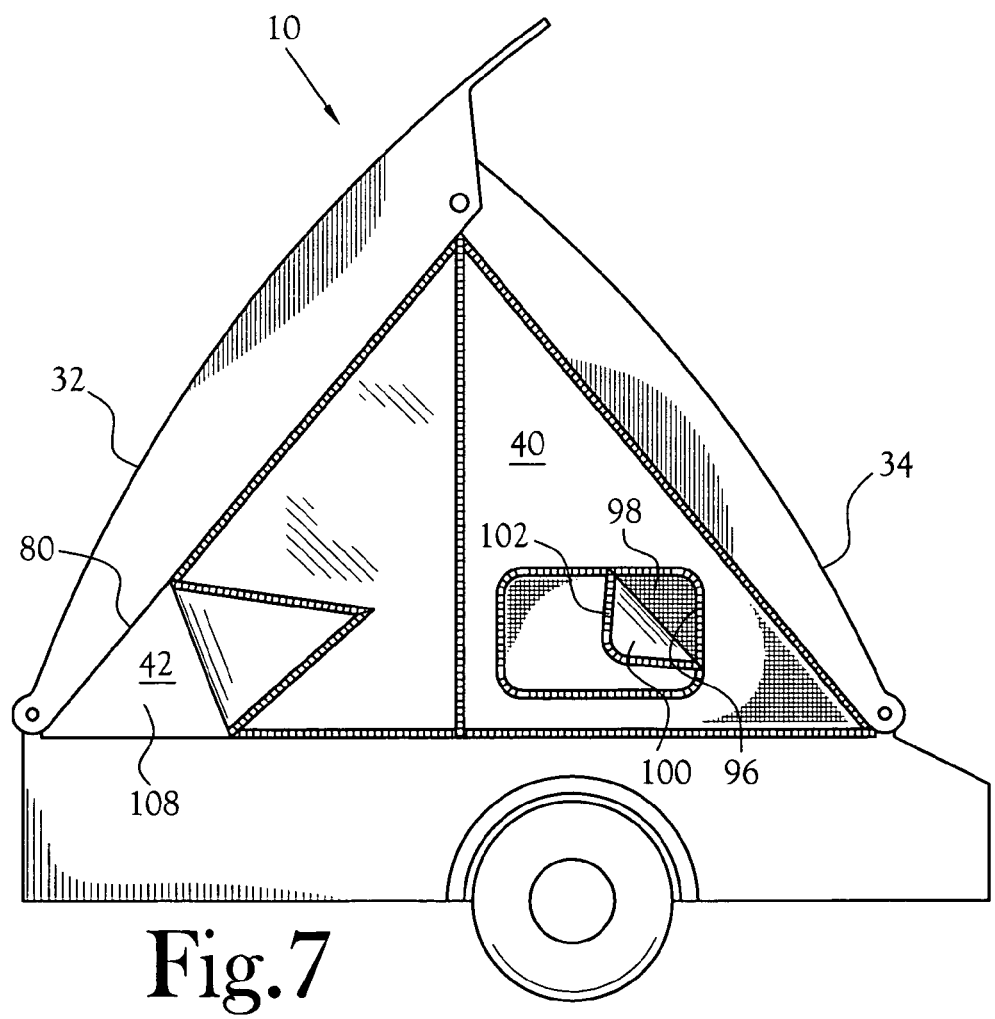
FIG. 7 is a side elevation view of the camper of FIG. 1, showing the cover and the window panel in the extended position with a side panel in place.

FIG. 7 is a side view of one embodiment of the camper 10 of the present invention, showing the cover 32 and the window panel 34 in the extended position. As shown in FIG. 7, at least one side panel 40 cooperates with the cover 32 and the window panel 34 to enclose an interior 42 within the camper 10. Each side perimeter 80 is adapted to receive at least one side panel 40, and at least one side panel 40 defines a vent opening 96. Each vent opening 96 is openable and closable to allow for regulation of air ventilation to the interior 42. At least one side panel 40 further defines an opening 108 to provide user access to the interior 42 of the camper.

The side panels 40 are adapted to engage the cover 32 and the window panel 34 to define an interior 42. In the illustrated embodiment, each side panel 40 is adapted to be removably attached to each side perimeter 80. However, those skilled in the art will recognize that each side panel 40 can be permanently attached to at least one edge of the side perimeter 80 without departing from the spirit and scope of the present invention. To this extent, more or fewer side panels may be employed to enclose a living space within the camper invention.

As illustrated in FIG. 7, the vent opening 96 includes a side screen 98 with integrated side cover 100. The side screen 98 comprises a substantially permeable fabric capable of promoting air ventilation to the interior 42. The side cover 100 comprises a material capable of limiting air ventilation through the vent opening 96. The side cover 100 is adapted to be semi-removably attached to the side panel 40 with a policable fastener 102. This configuration allows the side cover 100 to be adjusted from a position completely blocking the side screen 98 to a range of positions allowing for varying degrees of ventilation.

Figure 8:
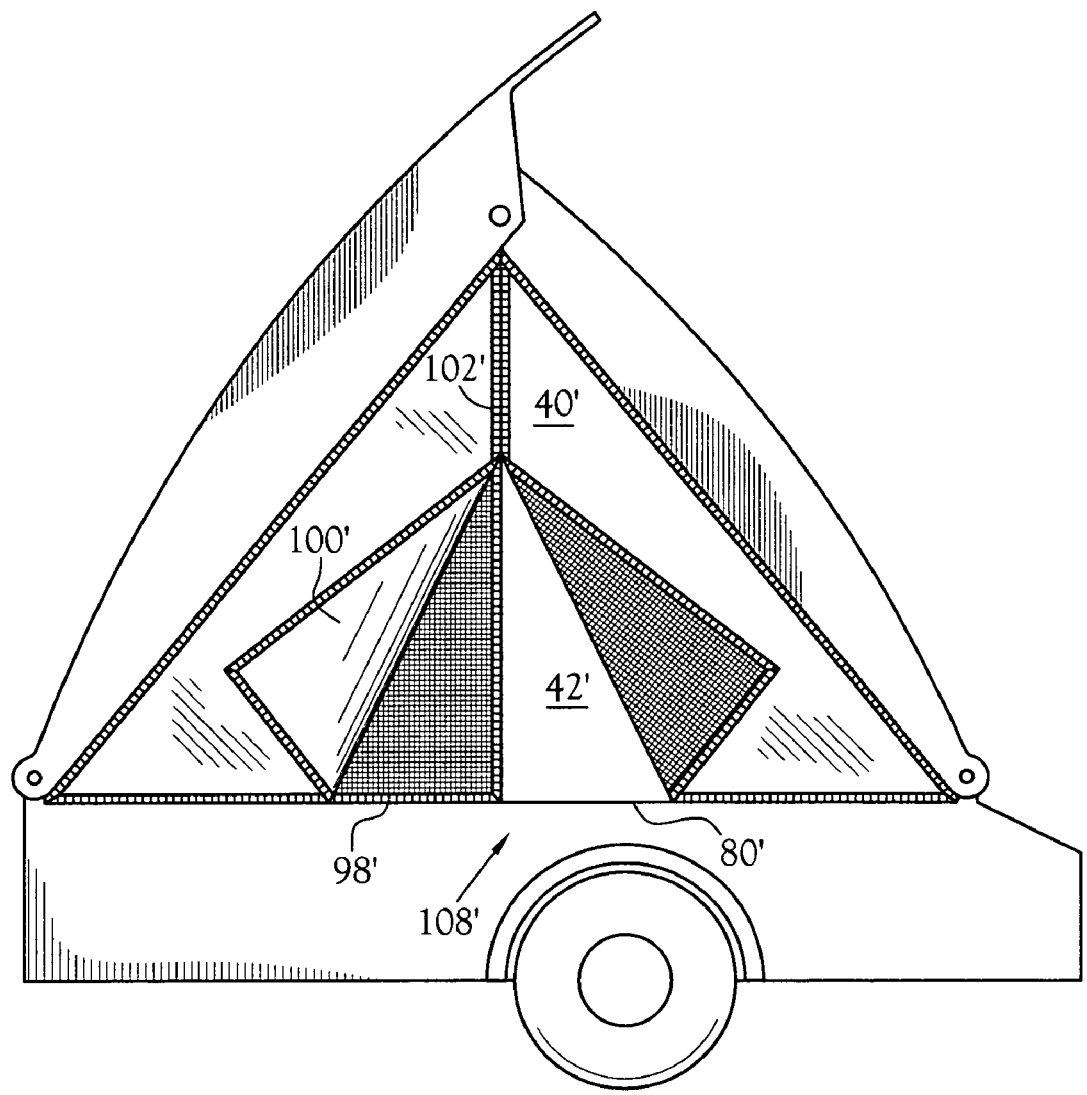
FIG. 8 is a partial side elevation view of an alternative embodiment of a camper constructed in accordance with several features of the present invention.

FIG. 8 is a partial side view of an alternative embodiment of the present invention. In the illustrated embodiment, the side screen 98' and corresponding side cover 100' define the side panel 40'. The side cover 100' is adapted to be semi-removably attached to the side screen 98' with a policable fastener 102'. Both the side cover 100' and the side screen 98' are adapted to be received by the side perimeter 80'. The side cover 100' and the side screen 98' cooperate to define an opening 108' to provide user access to the interior 42' of the camper. Of course, it is understood that other configurations are suitable for use in providing the side panel 40. To this extent, while the illustrated embodiment utilizes a side screen 98' and integrated side cover 100', it is understood by those skilled in the art that other devices may be used to regulate air ventilation within the camper 10 without departing from the spirit and scope of the present invention.

Figure 9:
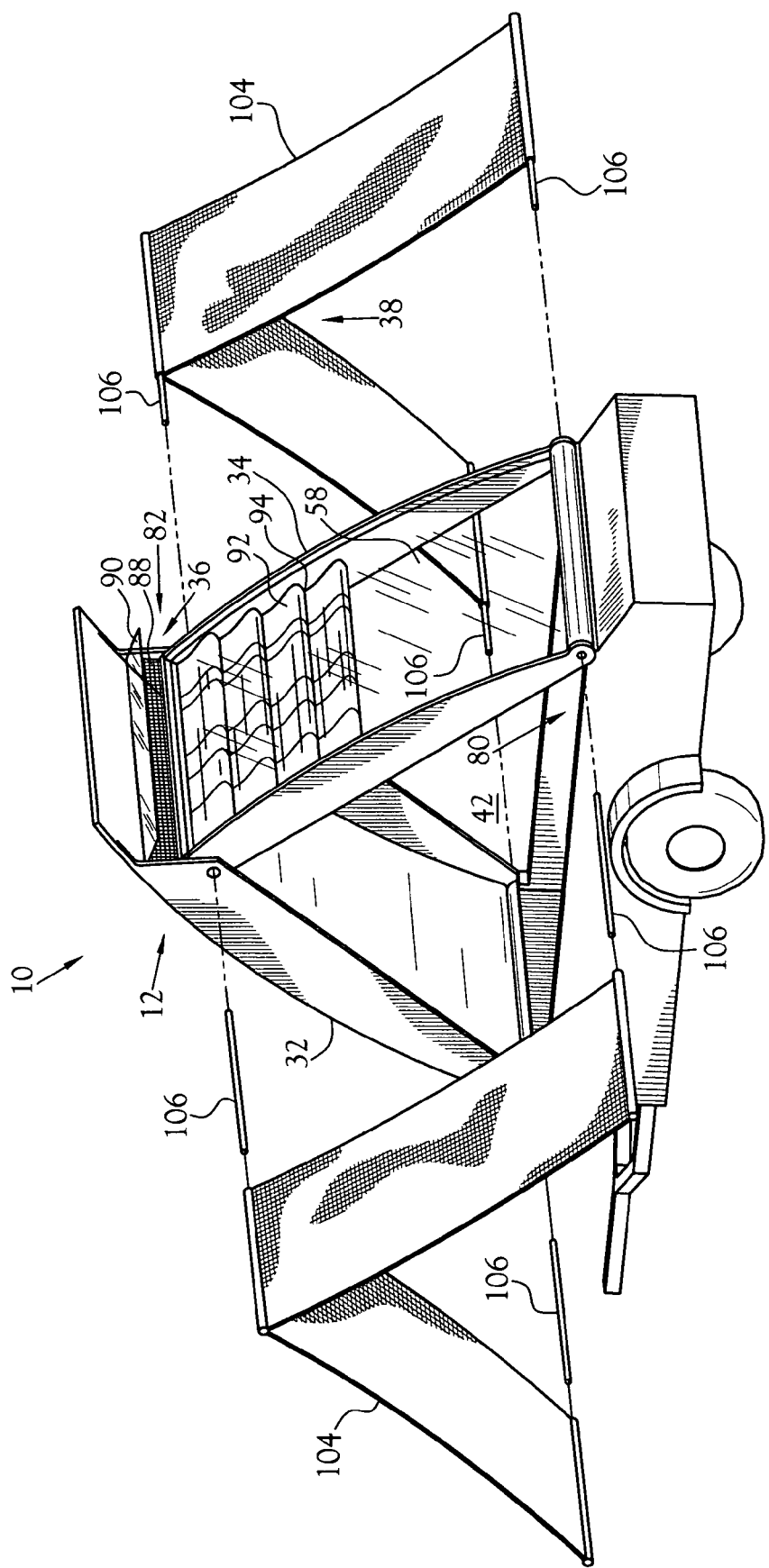
FIG. 9 is a partial perspective view of a camper, showing the cover and the window panel in the extended position with the awning partially exploded from the solar structure.

FIG. 9 is a partial perspective view of the camper 10 of the present invention. As shown in FIG. 9, the solar curtain 92 comprises a panel that is both heat-reflective and heat-insolative. The solar curtain 92 is adapted to releasably cover the window 58. This configuration allows the solar curtain 92 to be positioned to reflect solar radiation while insulating the cooler air within the interior 42, or to allow solar radiation to enter and warm the interior 42.

In the illustrated embodiment, the solar curtain 92 comprises a sheet of flexible, insolative material defining a substantially heat-reflective surface. The solar curtain 92 is removably attached to the window 58 such that the heat-reflective surface faces outwardly from the camper 10. Removal of the solar curtain 92 allows solar radiation to enter and warm the interior living space 42. Attachment of the solar curtain 92 to the window panel 34 allows the solar curtain 92 to reflect solar radiation away from the interior 42, thereby limiting solar warming of the interior 42. In the illustrated embodiment, attachment of the solar curtain 92 to the window panel 34 is achieved through a plurality of policable fasteners 94. Of course, those skilled in the art will recognize other possible configurations for positioning the solar curtain within the window panel, and the configuration depicted in this and the other figures with regard to the solar curtain is not intended to limit the solar curtain to such configuration.

Referring to FIG. 6A, the camper 10 is typically placed in the collapsed position for transportation. When in the collapsed position, the convex-arcuate profile of the cover 32 serves to increase the aerodynamic properties of the camper 10 and limit wind resistance generated by the camper 10 during travel. The cover 32 further serves to shield the various other elements of the solar structure 12 from damage.

As shown in FIG. 1, the solar structure 12 is configured in the extended position to define an interior 42. To utilize the temperature-regulating features of the camper 10, the camper 10 is positioned with the window panel 34 facing the sun. In order to maximize exposure of the window panel 34 to the sun throughout the course of a day, the camper 10 is typically positioned to allow the window panel 34 to face generally south when used in the northern hemisphere of the earth, and generally north when used in the southern hemisphere of the earth. From this orientation, the various elements of the solar structure 12 accomplish temperature regulation of the interior 42.

When the cover 32 and the window panel 34 are extended, sunlight strikes the exterior of the window panel 34 and enters the window 58. When the solar curtain 92 is removed from the window 58, sunlight is admitted into the interior 42 and allowed to warm the interior 42. If the solar curtain 92 is positioned to cover the window 58, the reflective surface of the outer face of the solar curtain 92 reflects the sunlight back out and away from the interior 42. The insolative nature of the solar curtain 92 further mitigates the sun's heat from entering the interior 42. In dark conditions, extension of the solar curtain 92 serves to retain heat within the interior 42 and limit heat loss due to thermal radiation through the window 58.

Referring to FIGS. 5, 7, and 9, the ridge vent 36 cooperates with the various vent openings 96 and the awning 38 to create a natural draft through the interior 42. When the ridge vent 36 and the vent openings 96 are placed in open configurations, warm air contained within the interior 42 is allowed to rise upwards through the ridge vent 36 as fresh air is allowed to enter through the vent openings 96. This fresh air is shaded by the shade panels 104 of the awning 38, such that the fresh air is cooler than the warm air vented through the ridge vent 36.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A camper having passive solar climate controls, said camper comprising:
   a base;
   a cover having a first end and a second end, said cover defining at least a first side wall and a second side wall, said first end of said cover being pivotally connected to said base, said cover first and second side walls cooperatively defining a first through receptacle proximate said cover second end;
   a window panel having a first end and a second end, said window panel defining a window being at least translucent, said window panel first end being pivotally connected to said base, said window panel further defining at least a first side wall and a second side wall, said window panel first and second side walls cooperatively defining a second through receptacle proximate said window panel second end;
   a solar curtain adapted to releasably cover said window;
   a plurality of side panels, at least one of said plurality of side panels defining an opening, each of said plurality of side panels being adapted to engage said cover and said window panel to define an interior, at least one of said plurality of side panels defining an entry opening for providing access to said interior; and
   a gable connector adapted to be received by said first through receptacle and said second through receptacle such as to hold said first through receptacle and said second through receptacle in substantial registration;
   whereby a ventilation opening is defined between said cover second end and said window panel second end when said first through receptacle and said second through receptacle are configured in substantial registration, said camper further including:
   a ridge vent adapted to be received by said ventilation opening, said ridge vent being selectively movable between an open position and a closed position.

2. The camper of claim 1, said base comprising a platform mounted on a vehicle chassis and a wall structure having a plurality of walls interconnected at associated edges to define a substantially rigid structure carried by said platform.

3. The camper of claim 1, said camper further comprising an awning positioned proximate said side panel and configured such as to provide shade to said side panel, said awning comprising a shade panel and a plurality of members configured to support said shade panel.

4. The camper of claim 1, said camper further comprising an awning positioned proximate said side panel and configured such as to provide shade to said side panel, said awning comprising a shade panel and a plurality of members configured to support said shade panel, wherein at least one of said plurality of members is telescopically connected to said pivotal connection between said cover and said base, wherein at least one of said plurality of members is telescopically connected to said pivotal connection between said window panel and said base, wherein at least one of said plurality of members is telescopically connected to said gable connector.

5. The camper of claim 1, wherein said first through receptacle is positioned offset from said cover second end such that said cover second end extends beyond said gable connector such as to provide an overhang, said overhang being positioned substantially above said ventilation opening.

6. The camper of claim 1, said cover defining a substantially arcuate profile such as to define a concave surface and a convex surface, wherein said concave surface is positioned facing said interior and wherein said convex surface is positioned facing outwardly.

7. The camper of claim 1, wherein said ventilation opening is defined by said window panel.

8. The camper of claim 1, wherein said ventilation opening is defined by said cover.

9. The camper of claim 1, said solar curtain defining a substantially heat-insolative panel with a substantially heat-reflective surface.

10. The camper of claim 1, wherein said solar curtain is movably attached to said window panel such as to allow said solar curtain to be extended to cover said window panel and to be retracted to expose said window panel.

11. The camper of claim 1, said window panel second end being slidably attached to said cover so as to define a collapsed position and an extended position.

12. The camper of claim 1, said window panel second end being slidably attached to said cover between said cover first end and said first through boring, such that said window panel and said cover cooperatively define a collapsed position and an extended position, said first through boring being positioned offset from said cover second end such that said cover second end extends beyond said first through boring such as to provide an overhang, said overhang being positioned substantially above said ventilation opening.

13. The camper of claim 1, wherein each of said plurality of side panels is fixedly attached to either of said base, said cover, or said window panel.

14. The camper of claim 1, said window defining a substantially arcuate profile such as to define a concave surface and a convex surface, wherein said concave surface is positioned facing said interior and wherein said convex surface is positioned facing outwardly.

15. The camper of claim 1, said camper further comprising:
a first side panel and a second side panel, each of said first side panel and said second side panel defining a vent opening, each of said first side panel and said second side panel cooperatively engaging said cover and said window panel to enclose said interior, said first side panel defining an entry opening for providing access to said interior;
wherein said window panel first end is pivotally connected to said base opposite said cover.

* * * * *